(12) United States Patent
Peng et al.

(10) Patent No.: US 7,088,895 B2
(45) Date of Patent: Aug. 8, 2006

(54) OPTICAL FIBER TWIG TREE

(75) Inventors: Chi-Tsung Peng, Hsin-Chu (TW); Kuo-Hsiang Wen, Hsin-Chu (TW)

(73) Assignee: Baycom-Electronics Technology Co., Ltd., Hsinchu (TW)

( * ) Notice: Subject to any disclaimer, the term of this patent is extended or adjusted under 35 U.S.C. 154(b) by 156 days.

(21) Appl. No.: 10/761,989

(22) Filed: Jan. 21, 2004

(65) Prior Publication Data

US 2005/0157992 A1 Jul. 21, 2005

(51) Int. Cl.
*G02B 6/04* (2006.01)
*F21V 7/04* (2006.01)
*F21S 4/00* (2006.01)
*A41G 1/00* (2006.01)
*A41G 33/00* (2006.01)

(52) U.S. Cl. .................... 385/115; 362/554; 362/567
(58) Field of Classification Search ............... 362/565, 362/567, 568; 385/115
See application file for complete search history.

(56) References Cited

U.S. PATENT DOCUMENTS

| | | | | | |
|---|---|---|---|---|---|
| 3,465,139 A | * | 9/1969 | Siegal | .................... | 40/431 |
| 3,766,376 A | * | 10/1973 | Sadacca et al. | ............... | 40/433 |
| 4,060,722 A | * | 11/1977 | Foley | .................... | 362/568 |
| 4,068,118 A | * | 1/1978 | Carrington | ................... | 362/123 |
| 4,471,412 A | * | 9/1984 | Mori | ........................... | 362/565 |
| 5,104,608 A | * | 4/1992 | Pickering | ................... | 362/568 |
| 5,333,226 A | * | 7/1994 | Stephens | .................... | 385/100 |
| 5,422,797 A | * | 6/1995 | Shattan | ....................... | 362/123 |
| 5,579,429 A | * | 11/1996 | Naum | ....................... | 385/143 |
| 5,962,088 A | * | 10/1999 | Tanaka et al. | ................ | 428/18 |
| 6,050,714 A | * | 4/2000 | Isabella | ...................... | 362/568 |
| 6,056,427 A | * | 5/2000 | Kao | ............................ | 362/581 |
| 2002/0118919 A1 | * | 8/2002 | Bruchmann | ................... | 385/31 |
| 2004/0120687 A1 | * | 6/2004 | Fung | .......................... | 385/147 |

* cited by examiner

*Primary Examiner*—Frank G. Font
*Assistant Examiner*—Ryan Lepisto
(74) *Attorney, Agent, or Firm*—J.C. Patents

(57) ABSTRACT

The present invention discloses an optical fiber twig tree, which comprises a plurality of plastic optical fiber bundles and a stand structure; wherein the plastic optical fiber bundles are designed in a shape corresponding to the branches of the optical fiber twig tree and tied into a fixed position by a tie. The plastic optical fiber bundles are disposed at the bottom of the stand, and coupled with an illuminating structure. A hook at one end of a main branch of the stand is latched into a screw of a branch base, such that the whole stand with the plastic optical fiber bundles can swing up and down freely to adjust their position at an angle. Further, the main stand comprises a plurality of branch bases to constitute the optical fiber twig tree, and such product can be used as a decoration for festivals or Christmas.

8 Claims, 4 Drawing Sheets

000000
OPTICAL FIBER TWIG TREE

BACKGROUND OF THE INVENTION

1. Field of the Invention

The present invention relates to an optical fiber twig tree that combines a plurality of plastic optical fiber bundles with a stand structure and the plastic optical fiber with an illuminating structure.

2. Description of the Prior Art

In general, a prior-art decorative tree has decorative leaves built on a stand, and traditional serially connected lamps wound around the whole tree structure if light is needed. However, the traditional setup has its shortcomings of being overheated bearing a risk of fire accidents, and increasing the cost due to the blinking light bulbs. The decorative tree of this sort definitely brings the safety concern to public places.

SUMMARY OF THE INVENTION

The primary objective of the present invention is to provide an optical fiber twig tree that combines a plurality of plastic optical fiber bundles with a stand, wherein the plastic fibers are wound along the branches of the stand and fixed to the main branches of the stand, such that the plastic optical fiber bundles are disposed on the whole structure and constitute an optical fiber twig tree. The product manufactured according to the invention adopts the plastic optical fiber bundle having a super side light, which gives the illuminating effect and is light in weight. Therefore, the stand can be made by a light-weighted plastic material instead of the traditional metal material. As a result, the overall structure is pleasing to the eyes, elegant, light in weight, easy-to-move, and easy-to-store. Such product can be used as a decoration in any necessary site.

BRIEF DESCRIPTION OF THE DRAWINGS

FIG. 1–2 is an illustrative view of the branch stand according to the present invention.

FIG. 2–1 is a cross-sectional view of the plastic optical fiber bundle according to the present invention.

FIG. 2–2 is an illustrative view of the illuminating structure according to the present invention.

DETAILED DESCRIPTION OF PREFERRED EMBODIMENTS

Figure 1:
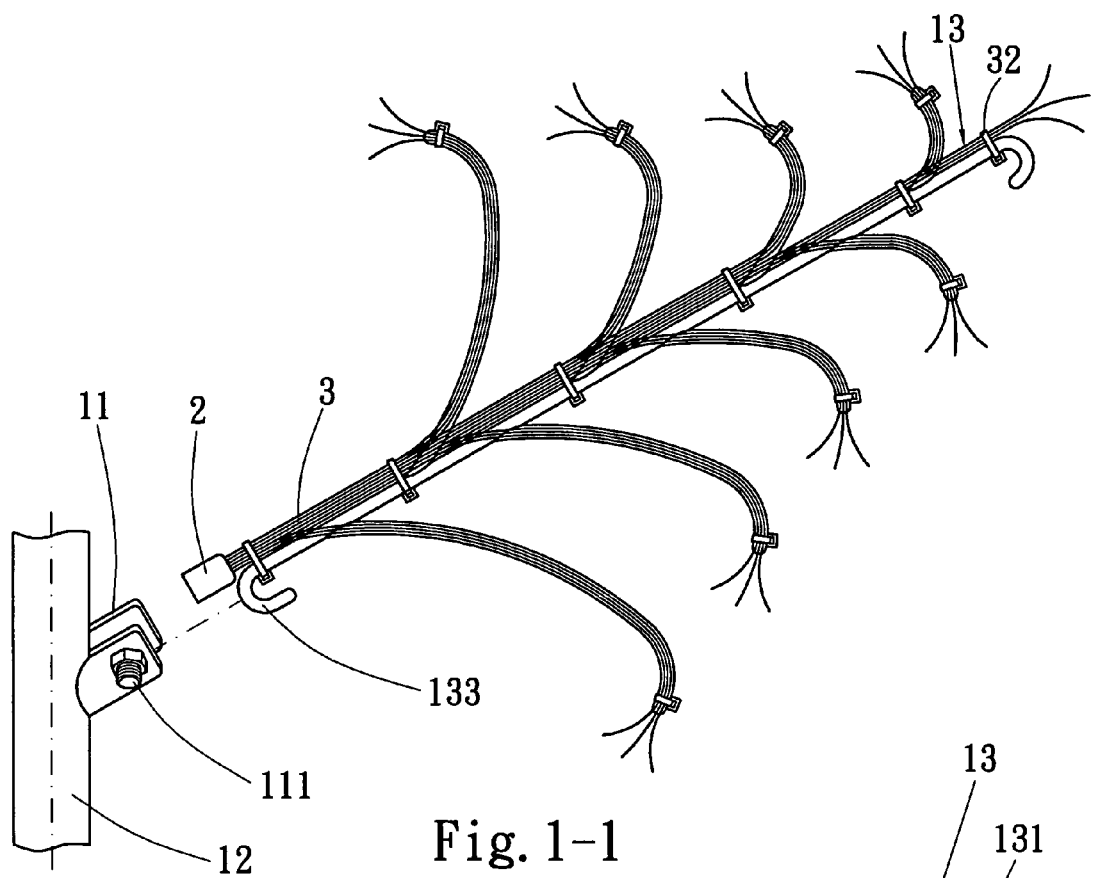
FIG. 1–1 is a view of combining the plastic optical fiber bundle, branch stand, and main stand according to the present invention.
Figures 1, 2:
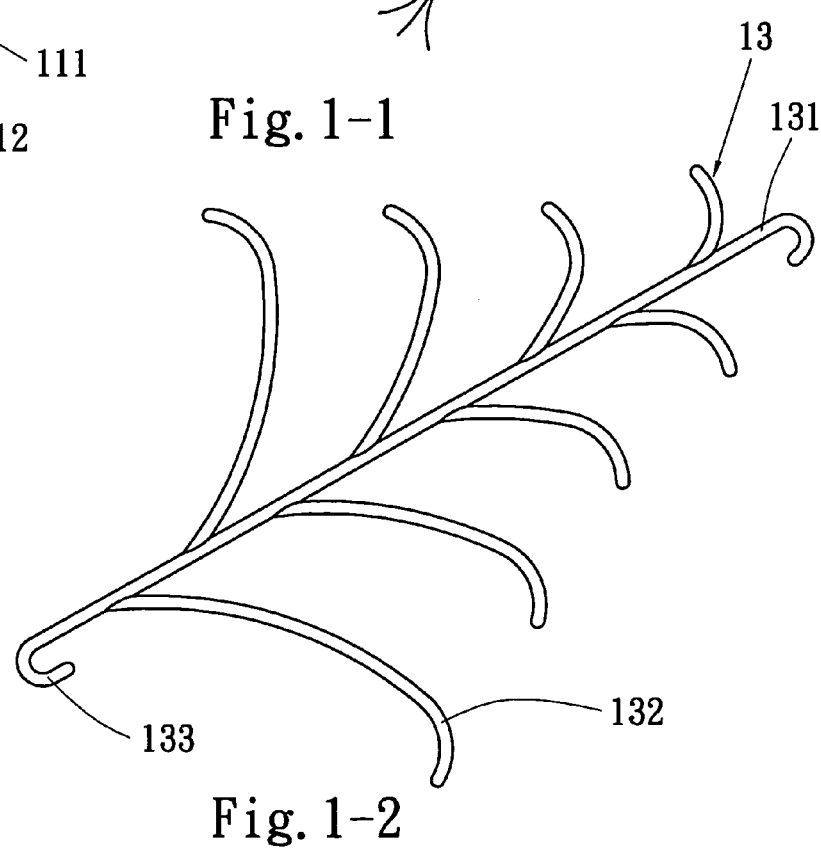
Figures 1, 2:
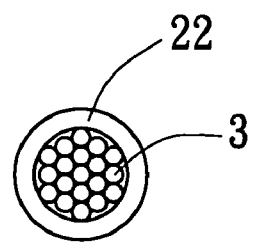
Figure 2:
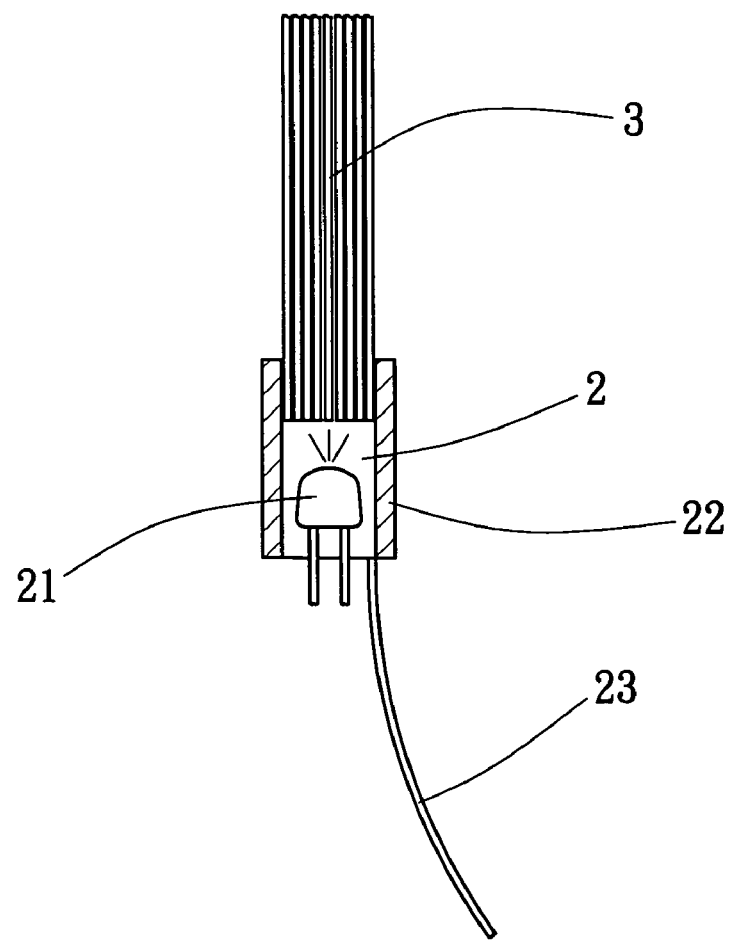
Figure 3:
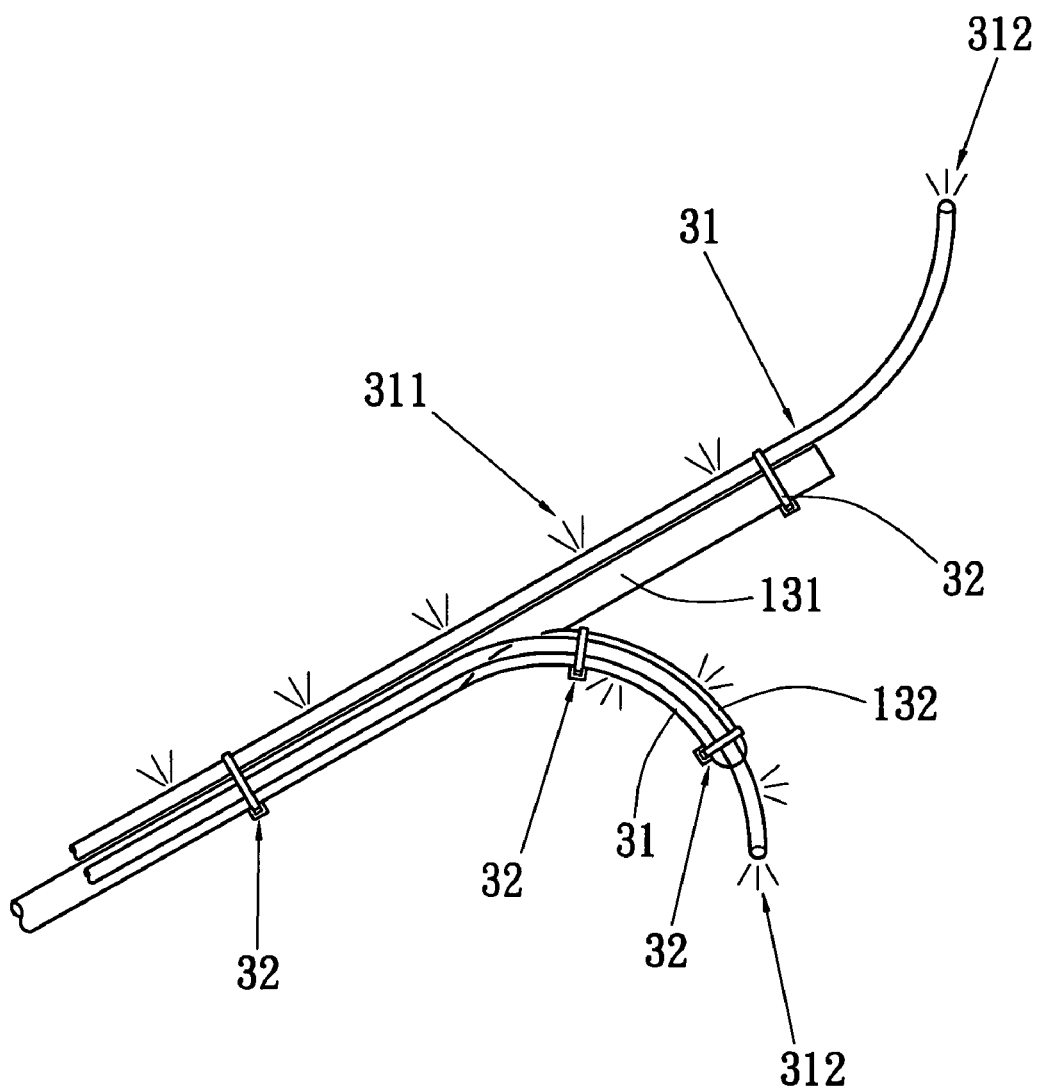
FIG. 3 is an illustrative view of the plastic fiber bundle being fixed onto the branch stand according to the present invention.
Figure 4:
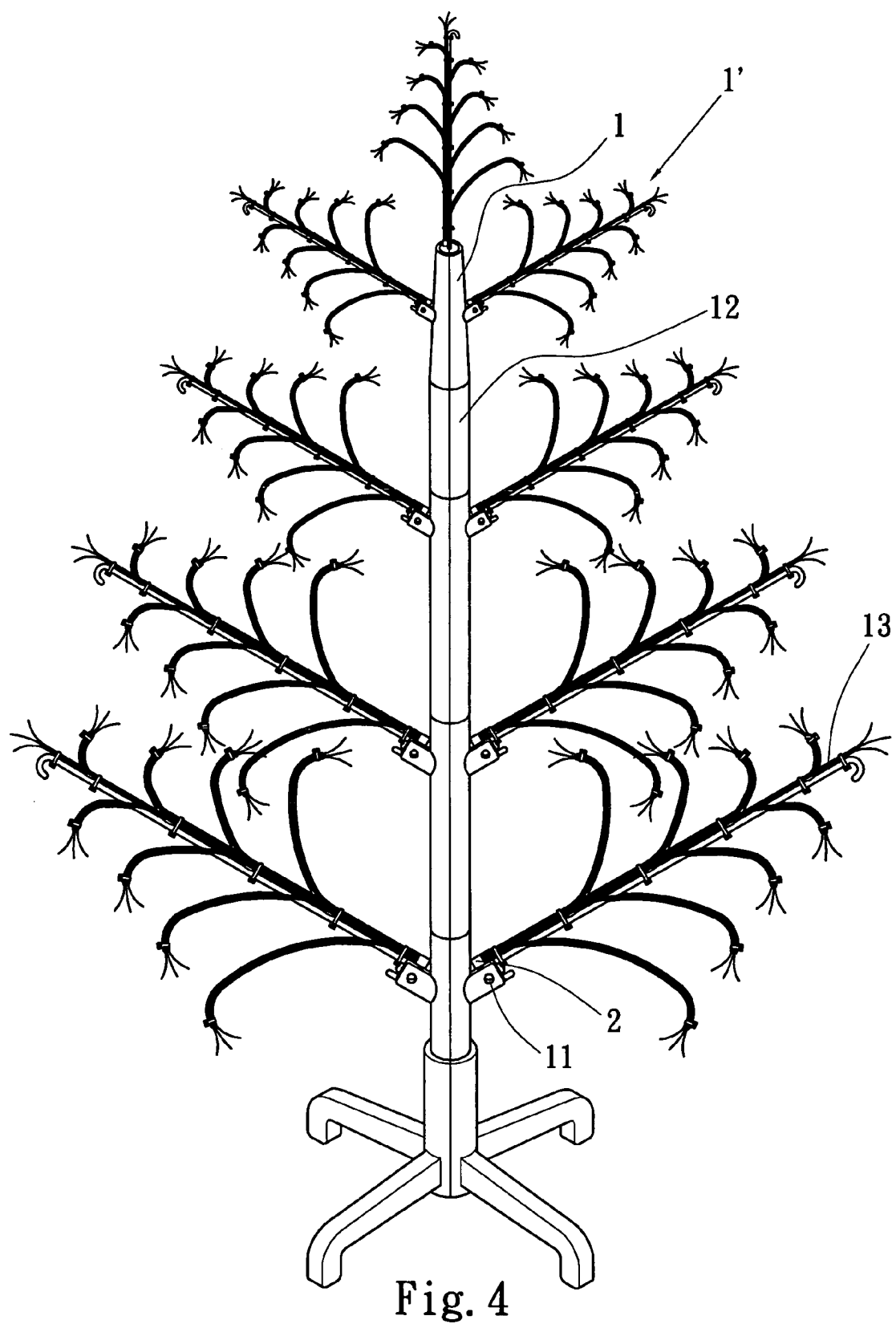
FIG. 4 is a view of a preferred embodiment of the present invention.

The present invention discloses an optical fiber twig tree 1' which comprises a plurality of plastic optical fiber bundles 3 and a stand structure 1, wherein the stand structure 1 comprises: a main stand 12 and a branch base 11 as shown in FIGS. 1–1 and 4. The branch stand 13 as shown in FIG. 1–2 comprises a main branch rod 131 and a branch rod 132 each on both sides, a hook 133 disposed at the end of the main branch rod 131, and the hook 133 hooks into a screw 111 in the branch base 11, such that the branch stand 13 can adjust its angle freely as shown in FIG. 3. The main branch rod 131 of the branch stand 13 comprises a plastic optical fiber 31 winding along the main branch rod 131 or the branch rod 132 according to their shape, and tied into a fixed position by a tie 32. Further, FIG. 2–1 shows the cross-sectional view of the plastic optical fiber bundle 3. In FIG. 2–2, the plastic optical fiber bundle 3 is coupled with an illuminating structure 2; wherein the illuminating structure 2 comprises an illuminating member 21 and a plastic tube 22, and the illuminating structure 2 is electrically coupled to a power cable 23 for supplying the electric power to illuminate the illuminating member 21, such that the plastic optical fiber bundle 31 as shown in FIG. 3 will produce a side light 311 and an extremity light 312.

Please refer to FIG. 4. In the figure, a plurality of branch stands 13 is fixed on the end surface of the main stand 12 to constitute a stand structure 1, and a plurality of plastic optical fibers 3 is fixed onto a plurality of branch stands 13 and the plastic optical bundle 3 is coupled to the illuminating structure 2 to produce the side light and extremity light effects for the optical fiber twig tree 1'. The product manufactured according to the invention can be used as a decoration in any desired site.

What is claimed is:

1. An optical fiber twig tree, comprising a plurality of plastic optical fiber bundles and a stand structure having a main stand and a plurality of branch bases; wherein said plastic optical fiber bundles wind along a plurality of branch stands according to the shape of said branch stands, and being fixed by a tie, thereby said optical fiber twig tree being used for a site requiring an illuminating decoration; wherein each of said branch stands comprises a main branch and a hook at the tip of said main branch for hooking into a screw disposed in a corresponding one of said branch bases, such that said main branch is capable of moving up and down to adjust to a desired angle when being combined with said plastic optical fiber bundles.

2. An optical fiber twig tree according to claim 1, wherein each of said plastic optical fiber bundles comprises a pluxality of plastic optical fibers, and each of said plastic optical fibers produces a side light from its side and an extremity light from its end point.

3. An optical fiber twig tree according to claim 1, wherein each of said plastic optical fiber bundles is disposed at the bottom of a corresponding one of said branch stands and coupled with an illuminating structure.

4. An optical fiber twig tree according to claim 1, wherein said main stand and branch bases are made of one selected from the collection of a metal material and a plastic material.

5. An optical fiber twig tree comprising:
   a plurality of plastic optical fiber bundles;
   a stand structure having a main stand and a plurality of branch bases; and
   a plurality of illuminating structures;
   wherein said plastic optical fiber bundles wind along a plurality of branch stands according to the shape of said branch stands, each of said plastic optical fiber bundles is disposed at the bottom of a corresponding one of said branch stands and coupled with a corresponding one of said illuminating structures, and each of said branch stands comprses a main branch and a hook at the tip of said main branch for hooking into a screw disposed in a corresponding one of said branch bases, such that said main branch is capable of moving up and down to adjust to a desired angle when being combined with said plastic optical fiber bundles.

6. An optical fiber twig tree according to claim 5, wherein each of said plastic optical fiber bundles comprises a plurality of plastic optical fibers, and each of said plastic optical fibers produces a side light from its side and an extremity light from its end point.

7. An optical fiber twig tree comprising:
a plurality of plastic optical fiber bundles;
a main stand; and
a plurality of branch bases formed on the main stand; and
a plurality of branch stands;
wherein said plastic optical fiber bundles wind along said branch stands according to the shape of said branch stands, and each of said branch stands is adjustably attached to a corresponding one of said branch bases, and each of said branch stands comprises a main branch and a hook at the ti of said main branch for hooking into a screw disposed in a corresponding one of said branch bases, such that said main branch is capable of moving up and down to adjust to a desired anal when being combined with said plastic optical fiber bundles.

8. An optical fiber twig tree according to claim 7, wherein each of said plastic optical fiber bundles comprises a plurality of plastic optical fibers, and each of said plastic optical fibers produces a side light from its side and an extremity light from its end point.

* * * * *